Dec. 11, 1923.
P. SZYDLOWSKI
1,476,851
TILTING STEERING WHEEL FOR MOTOR DRIVEN VEHICLES
Filed May 17, 1922
3 Sheets-Sheet 1

Inventor
Paul Szydlowski
By J. E. Thomas
Attorney

Dec. 11, 1923.  1,476,851
P. SZYDLOWSKI
TILTING STEERING WHEEL FOR MOTOR DRIVEN VEHICLES
Filed May 17, 1922  3 Sheets-Sheet 2

Paul Szydlowski, Inventor
By S.L. Thomas, Attorney

Dec. 11, 1923.　　　　　　　　　　　　　　1,476,851
P. SZYDLOWSKI
TILTING STEERING WHEEL FOR MOTOR DRIVEN VEHICLES
Filed May 17, 1922　　　　3 Sheets-Sheet 3
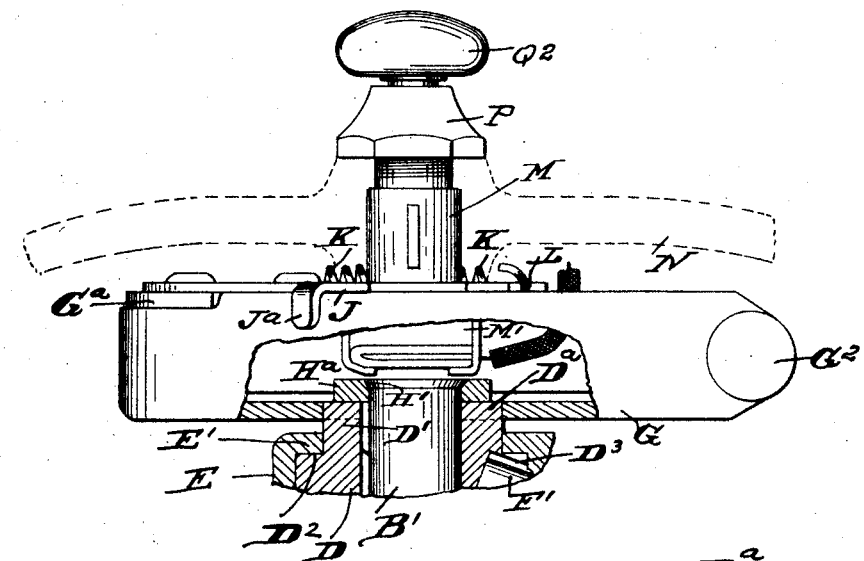
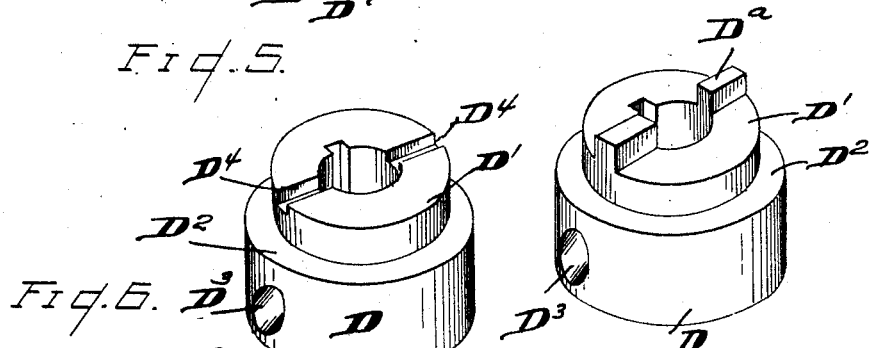
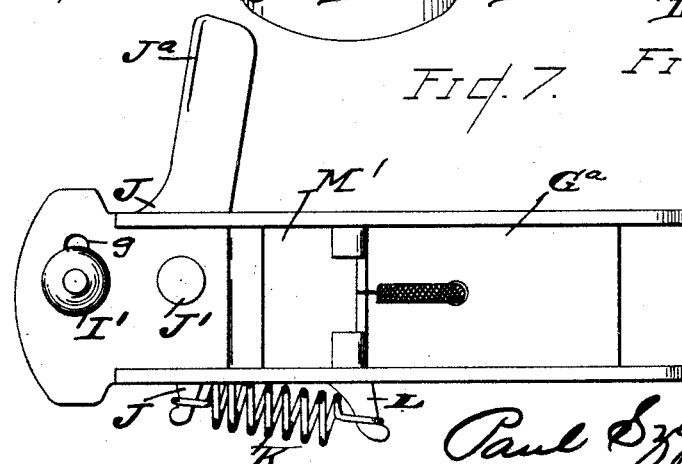
Inventor
Paul Szydlowski
By S. E. Thomas
Attorney Patented Dec. 11, 1923.

1,476,851

UNITED STATES PATENT OFFICE.

PAUL SZYDLOWSKI, OF DETROIT, MICHIGAN.

TILTING STEERING WHEEL FOR MOTOR-DRIVEN VEHICLES.

Application filed May 17, 1922. Serial No. 561,565.

*To all whom it may concern:*

Be it known that I, PAUL SZYDLOWSKI, a citizen of the United States, residing at Detroit, county of Wayne, State of Michigan, have invented a certain new and useful Improvement in Tilting Steering Wheels for Motor-Driven Vehicles, and declare the following to be a full, clear, and exact description of the same, such as will enable others skilled in the art to which it pertains to make and use the same, reference being had to the accompanying drawings, which form a part of this specification.

My invention relates to a tilting steering wheel for motor driven vehicles shown in the accompanying drawings and more particularly described in the following specification and claims.

Many drivers of automobiles find it difficult to enter or leave the driver's seat on account of the space occupied by the steering wheel as ordinarily constructed;—the primary object of this invention therefore is to provide means whereby the steering wheel may be tilted so that the driver may readily enter or leave the vehicle, the steering wheel being restored to its driving position upon the driver taking his seat.

Another object is to provide a tilting steering wheel in combination with a steering wheel lock, whereby the steering mechanism may be rendered inoperative by any unauthorized person during the absence of the owner of the vehicle.

While the device may be used in connection with different types of motor driven vehicles it is especially designed for use upon the so-called "Ford" automobile.

A further object is to combine with the device means for actuating a signal horn.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 5 is a side elevation with parts broken away, showing a modification of the means for mounting the bracket upon the lock fitting carried by the gear case cover.

Figure 6 is an inverted plan view of the hinged bracket cover showing the manner of rigidly securing the divided extension of a steering wheel spindle between the side walls of the hinged cover of the tilting bracket,— upon which the steering wheel is mounted— that the steering wheed bracket and spindle may turn as a unit with the steering wheel.

Figure 7 is a perspective view of a detail of the lock collar showing the transverse groove at its projecting end to receive the lug formed in the wall of the tilting bracket as indicated in Figure 2 of the drawings.

Figure 8 is a perspective view of a modification of the lock collar as shown in Figure 5 of the drawings.

Figure 1:
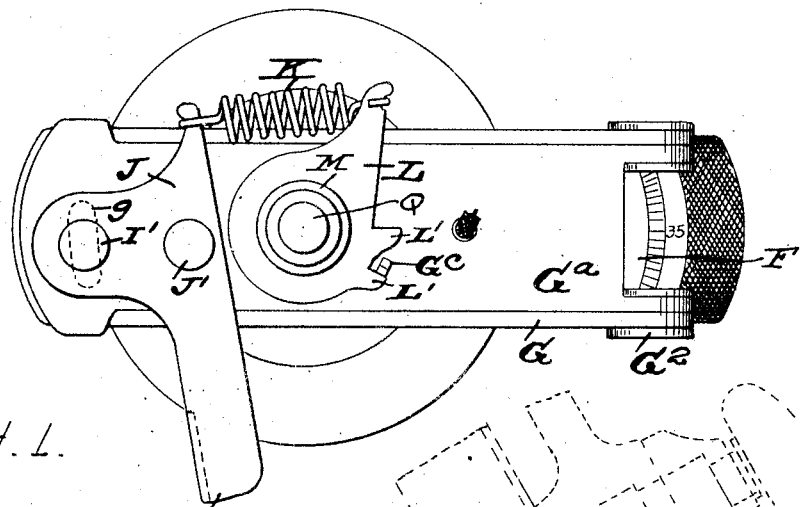
Figure 1 is a plan view of a tilting bracket adapted to support a steering wheel mounted upon the shaft of a Ford motor vehicle.

Referring now to the letters of reference placed upon the drawings:

A, denotes the usual planetary gear case mounted upon the gear post of a Ford automobile. B, is the usual driving pinion in mesh with the steering gear pinions C. B' is the usual stub shaft carried by the pinion B on which is keyed a collar D with an upwardly projecting end D' of relatively smaller diameter, forming a shoulder $D^2$. E, is a cover screwed onto the gear case having a flange E' overlapping the shoulder $D^2$ of the collar D. $E^2$ denotes a pin to secure the cover E when screwed upon the gear case. F, is a suitable lock mechanism mounted in a projecting portion $E^3$ formed in the wall of the cover and F' is the slidable bolt of the lock adapted to enter a bore $D^3$ in the collar D to secure the steering post against rotation. While any suitable lock mechanism may be employed, that indicated by the drawing is the subject matter of an application executed of even date herewith. G, is a bracket member of rectangular box-like shape having projecting lugs G' G' struck from the lower wall of the bracket adapted to enter transverse grooves $D^4$ formed in the end D' of the collar D. H, is a washer sleeved upon the stub shaft B' overlapping the wall of the bracket G, and riveted to the end of the stub shaft as indicated at H', to secure the bracket, collar D, and gear case cover together as a unit. Hinged at $G^2$ is a cover plate $G^a$ for the bracket G. Secured to the bottom wall of the bracket is a stud I having a tapering locking head $I^a$, adapted to co-operate with a like movable locking stud I', secured to a swinging latch J pivoted at J' to the cover plate. $g$, is a slot in the cover plate through which the locking stud I' swings to release or engage its co-acting stud. K, is a spring attached to the swinging latch bar J, and to an adjustable plate L sleeved upon an extension M of the steering wheel shaft. L' L' are projecting lugs on the plate L adapted to engage a lug $G^c$ struck up from the cover plate $G^a$. The tension of the spring K may be regulated by rotatably adjusting the plate L upon the extension M of the steering post so that one or the other of the lugs L' may engage the lug $G^c$ on the cover of the bracket G. $J^a$ is a handle or extension of the latch for manually actuating the latter that the co-acting interlocking studs I and I' may be released from locking engagement when it is desired to tilt the steering wheel. The extension M of the steering wheel shaft is squared at M' that it may be snugly held between the side walls of the bracket G against rotation therein. N, is a steering wheel keyed to the extension post M and P is a nut screwed to the threaded end of the extension post M to secure the steering wheel in position. Q, is a spring actuated plunger mounted in a bore of the extension post M of the steering wheel shaft, adapted when operated against the action of the spring Q' to close an electric circuit through an electric terminal R, to a battery and horn—not shown. $Q^2$ is a knob mounted on the end of the plunger Q, for convenience in operating the latter.

Figure 2:
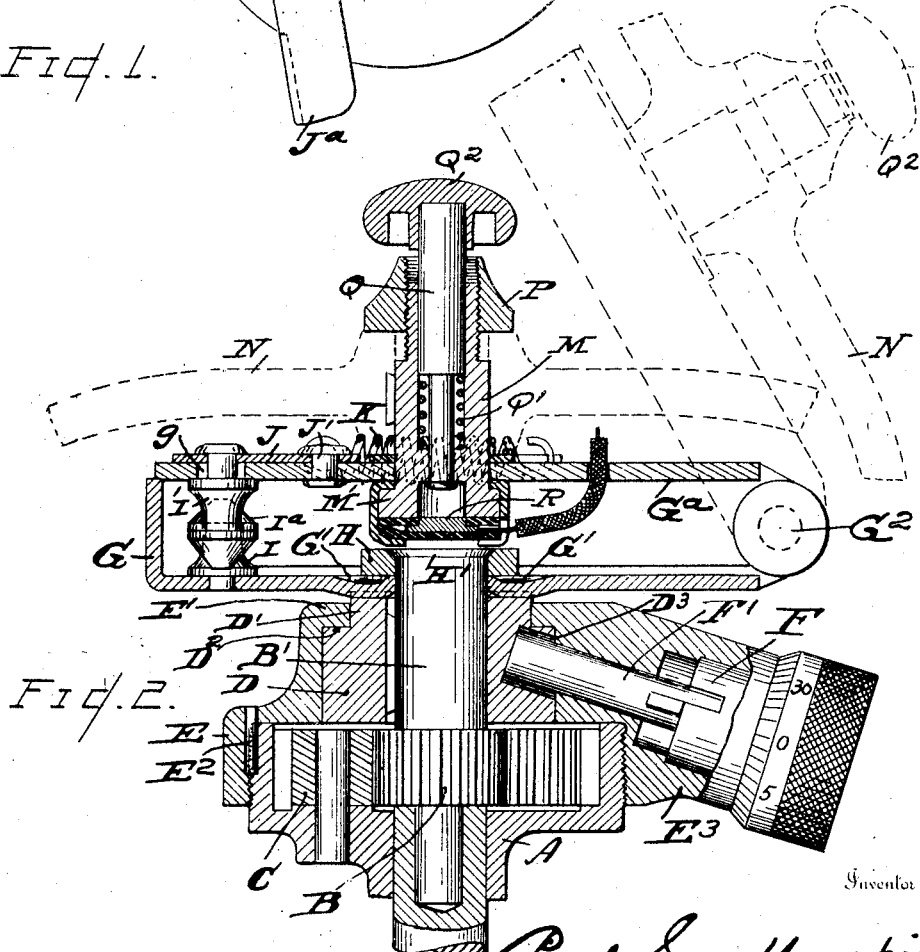
Figure 2 is a vertical cross-sectional view through the tilting bracket, gear case and lock mechanism, showing in dotted lines the steering wheel in its usual driving position and also in its tilted position.
Figure 3:
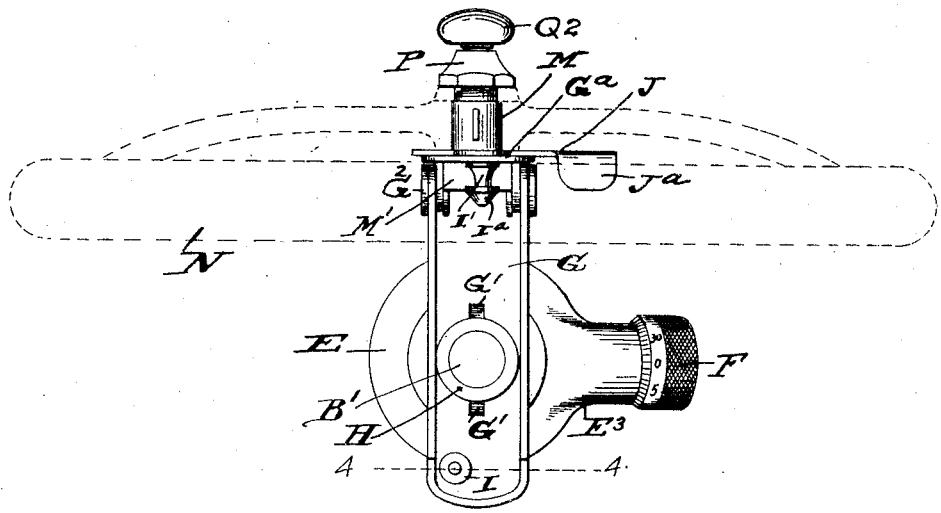
Figure 3 is a plan view of the device with the hinged cover of the tilting bracket raised;—the steering wheel carried by the cover being indicated in dotted lines in its raised position.
Figure 4:
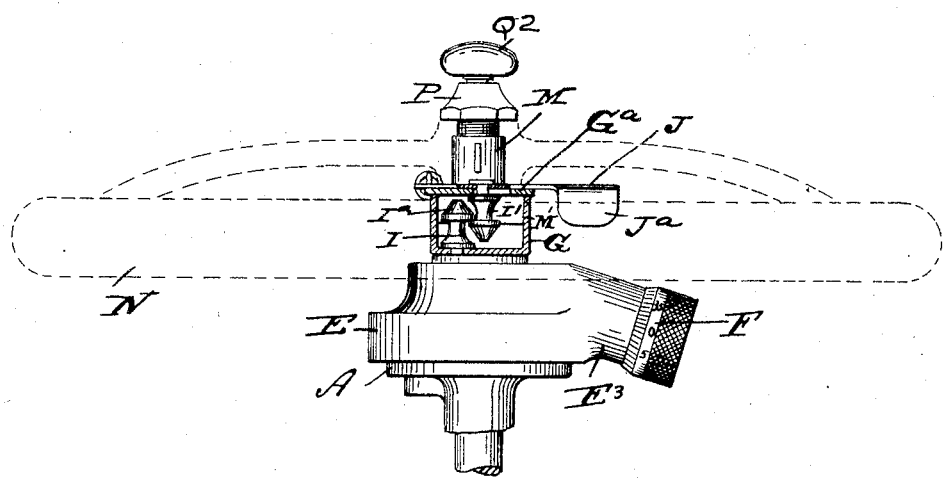
Figure 4 is a cross-sectional view through the tilting bracket taken on or about line 4—4 of Figure 3 showing the automatically operated interlocking elements which secure the cover in closed position upon the supporting bracket.

In Figures 5 and 8 I have shown a modification of the means for locking the bracket to the collar D carried by the stub shaft carrying the driving pinion of the steering gear mechanism. In the modification the end of the collar is provided with a projecting transverse lug $D^a$ on either side of its central bore;—as indicated the lug $D^a$ projects through a slot extending radially from the opening through which the stub shaft projects in the base of the bracket. $H^a$ is a washer similar to that shown in Figure 2 overlapping the base of the bracket and the lugs $D^a$ in the collar D,—the stub shaft B' is riveted as at H' to engage the washer as shown in Fgure 5, thereby joining the bracket, collar and gear case together as a unit as previously described.

Having indicated the several parts by reference letters the construction and operation of the device will be readily understood.

When it is desired to tilt the wheel so that the driver may conveniently enter or leave his seat, the latch J is manually actuated to withdraw the locking stud I' from engagement with the locking stud I, held in interlocking relation by the action of the spring K,—the steering wheel is then tipped backwardly upon the pivot $G^2$ of the bracket, and when it is desired to return the wheel to its former position it may be lowered into place, the tapering heads of the locking studs permitting them to pass against the action of the spring K and automatically lock. When it is desired to sound the signal horn it is only necessary to bear upon the handle $G^3$ thereby forcing the plunger downwardly closing the circuit through the terminal below as will be well understood. When it is desired to lock the vehicle so that the steering wheel cannot be operated during the absence of the owner, the locking mechanism is actuated so that its locking bolt is projected into the cavity provided in the annular collar D keyed to the stub shaft of the driving pinion. The peculiar type of lock indicated in the present embodiment is described and claimed in an application for patent executed of even date herewith and forms no part of the present invention as either a permutation or other type of lock may be employed as desired. The present invention includes means however adapted to receive the slidable bolt of a suitable lock, said means being also adapted to receive and secure the hinged bracket to which the steering wheel is connected whereby it may be tilted into or out of position as required.

Having thus described my invention what I claim is:

1. In a device of the character described; a steering wheel shaft; a collar keyed to the steering wheel shaft; a bracket secured to the collar, whereby the bracket, collar and shaft may operate as a unit; a cover plate hinged to the bracket; an aligned extension of the steering wheel shaft secured to the cover plate, a steering wheel mounted on said extension of the steering wheel shaft; means for locking said hinged cover plate to the bracket, and manually operated means for releasing said locking means.

2. In a device of the character described; a steering wheel shaft; a collar keyed to the steering wheel shaft; a bracket having an interlocking connection with the collar, whereby the bracket, collar and shaft may operate as a unit; a cover plate hinged to the bracket; an aligned extension of the steering wheel shaft secured to the cover plate; a steering wheel mounted on the extension of the steering wheel shaft; means for automatically locking said cover plate to the bracket, and manually operated means for releasing said automatic locking means.

3. In a device of the character described; a steering wheel shaft; a collar keyed to the steering wheel shaft; a bracket having an interlocking connection with the collar, whereby the bracket, collar and shaft may operate as a unit; a washer sleeved on the steering wheel shaft overlapping the wall of the bracket, the end of the steering wheel shaft being riveted to the washer; a cover plate hinged to the bracket; an aligned extension of the steering wheel shaft fitted with a steering wheel secured to the cover plate; means for automatically locking said cover plate to the bracket, and manually operated means for releasing said locking means.

4. In a device of the character described; a steering wheel shaft; a collar keyed to the steering wheel shaft having a transverse groove at one end of the collar; a bracket provided with lugs adapted to enter the grooves of said collar; a washer overlapping the wall of the bracket and riveted to the steering wheel shaft, whereby the bracket, collar and shaft may operate as a unit; a cover plate hinged to the bracket, an aligned extension of the steering wheel shaft fitted with a steering wheel secured to the cover plate, means for locking said cover plate to the bracket and manually operated means for releasing said locking means.

5. In a device of the character described; a steering wheel shaft; a collar keyed to the steering wheel shaft; a bracket secured to the collar, whereby the bracket, collar and shaft may operate as a unit, said bracket provided with a stud having an overhanging head; a cover plate hinged to the bracket; an aligned extension of the steering wheel shaft fitted with a steering wheel secured to the cover plate; a swinging latch bar pivoted to the cover plate provided with a stud having an overhanging head adapted to coordinate with the overhanging head of the stud carried by the bracket, whereby an automatic interlocking relation may be effected between the cover plate and bracket, and manually operated means for releasing said locking means.

6. In a device of the character described; a steering wheel shaft; a collar keyed to the steering wheel shaft; a bracket secured to the collar, whereby the bracket, collar and shaft may operate as a unit, said bracket provided with a stud having an overhanging head, a cover plate hinged to the bracket; an aligned extension of the steering wheel shaft fitted with a steering wheel secured to the cover plate; and a manually released spring actuated latch-bar pivoted to the cover plate provided with a stud having an overhanging head adapted to engage the overhanging head of the stud carried by the bracket, whereby the cover plate may be automatically locked to the bracket and manually released from its interlocking relation with the latter.

7. In a device of the character described; a steering wheel shaft; a collar keyed to the steering wheel shaft; a bracket secured to the collar, whereby the bracket, collar and shaft may operate as a unit, said bracket provided with a stud having an overhanging head; a cover plate hinged to the bracket; an aligned extension of the steering wheel shaft fitted with a steering wheel secured to the cover plate; a manually released latch-bar pivoted to the cover plate provided with a stud having an overhanging head adapted to engage the overhanging head of the stud carried by the bracket; a spring to effect an automatic coupling relation between said studs to secure the cover plate upon the bracket and means for adjusting the tension of said spring.

8. In a device of the character described; a steering wheel shaft; a collar keyed to the steering wheel shaft; a bracket secured to the collar, whereby the bracket, collar and shaft may operate as a unit, said bracket provided with a stud having a cone-shaped overhanging head; a cover plate hinged to the bracket; an aligned extension of the steering wheel shaft fitted with a steering wheel secured to the cover plate; a manually released latch-bar pivoted to the cover plate provided with a stud having a cone-shaped overhanging head adapted to engage the cone-shaped overhanging head of the stud carried by the bracket; a spring to effect an automatic coupling relation between said studs to secure the cover plate upon the bracket and means for adjusting the tension of said spring.

In testimony whereof, I sign this specification in the presence of two witnesses.

PAUL SZYDLOWSKI.

Witnesses:
S. E. THOMAS,
MAURICE WOLF.